United States Patent [19]

Eisen et al.

[11] Patent Number: 5,534,299

[45] Date of Patent: Jul. 9, 1996

[54] PROCESS FOR INSULATING PIPES

[75] Inventors: Norbert Eisen, Köln; Lutz-Peter Godthardt, Leverkusen, both of Germany

[73] Assignee: Bayer Aktiengesellschaft, Leverkusen, Germany

[21] Appl. No.: 453,838

[22] Filed: May 30, 1995

[30] Foreign Application Priority Data

Jun. 22, 1994 [DE] Germany ............... 44 21 817.6

[51] Int. Cl.⁶ .................................................. B05D 3/02
[52] U.S. Cl. ................ 427/373; 427/388.4; 427/409; 427/421; 264/45.7; 264/54
[58] Field of Search .................. 427/409, 388.4, 427/373, 421; 264/45.7, 51, 54

[56] References Cited

U.S. PATENT DOCUMENTS

| | | | |
|---|---|---|---|
| 4,263,408 | 4/1981 | Meyborg et al. | 521/51 |
| 5,047,439 | 9/1991 | Sano et al. | 521/78 |
| 5,114,755 | 5/1992 | Canaday et al. | 427/373 |
| 5,269,986 | 12/1993 | Eisen et al. | 264/46.4 |
| 5,270,348 | 12/1993 | Muller et al. | 521/159 |

FOREIGN PATENT DOCUMENTS

| | | |
|---|---|---|
| 2110594 | 12/1992 | Canada . |
| 54210 | 6/1982 | European Pat. Off. . |
| 3609540 | 10/1986 | Germany . |
| 4022741 | 1/1992 | Germany . |

OTHER PUBLICATIONS

Translation of EP 054210, Jun. 1982.
Translation of DE 4022741, Jan. 1992.
Translation of DE 3609540, Oct. 1986.

*Primary Examiner*—Michael Lusignan
*Assistant Examiner*—Erma Cameron
*Attorney, Agent, or Firm*—Joseph C. Gil

[57] ABSTRACT

A process for insulating pipes comprises applying at least one layer of a polyisocyanurate plastic and then at least one layer of rigid polyurethane foam to a steel pipe. The foam is covered with an outer layer.

10 Claims, No Drawings

PROCESS FOR INSULATING PIPES

BACKGROUND OF THE INVENTION

Pipes insulated with rigid polyurethane foam are principally used in providing heating services. The composite plastic-jacketed pipe system is universally used for such purposes. This system comprises factory-insulated pipes consisting of a steel heating medium pipe, a polyethylene jacketing pipe together with rigid polyurethane foam as the insulating material. The pipes are laid in a sand bed. The composite plastic-jacketed pipe heating line comprises a composite of these three components.

Insulation is customarily achieved by filling the cavity between the steel pipe and the heating medium pipe with foam.

The preinsulated pipes are suitable for direct laying in the ground in a sand bed. Space requirements are low. The plastic-jacketed pipe may be adapted to construction circumstances and welded together at any desired point. Considerable cost savings are achieved due to the composite system of the plastic-jacketed pipe.

Other techniques, such as the shrouded conduit system require considerably costlier laying techniques.

The rigid polyurethane foams which are customarily used today are designed for continuous operating temperatures of up to 130° C. with short peaks of up to 140° C. This is adequate for most Western European district heating networks. Eastern European power stations, however, supply substantially higher flow temperatures, which may reach 200° C. The rigid polyurethane foam which is currently customarily used is not suitable for such temperature ranges. As a solution, systems with a two-layered structure for the thermal insulation are known. The inner layer exposed to high temperatures consists of inorganic mineral fibers. Rigid polyurethane foam is used as a second layer of insulation. However, this technique no longer provides a composite system as the adhesion of the mineral fibers on the steel heating medium pipe to the polyurethane foam is very small. Such a "sliding system" requires considerably costlier compensation for axial displacement forces and the installation of fixed points.

The object of the present invention was to provide thermal insulation suitable for high temperature service which forms a composite system with the steel and jacketing pipe.

DESCRIPTION OF THE INVENTION

The present invention provides a process for insulating pipes wherein at least one inner layer substantially consisting of a polyiso-cyanurate plastic is applied to a steel pipe, and a second layer consisting of rigid polyurethane foam is applied thereto.

The inner layer, which is preferably applied by rotational molding (as described in German Offenlegungsschrift 4,118, 362), by spraying or by foam molding, generally has a density in the range from 200 to 1,100 kg/m$^3$, preferably of 300 to 500 kg/m$^3$. The second layer of rigid poly-urethane foam may be produced using the customary foam molding process or, preferably, also using the rotational molding or spraying process. The second layer preferably has in the range from 80 to 100 kg/m$^3$. The inner polyisocyanurate plastic has a very high thermal stability and a good adhesion to the steel pipe.

The good thermal insulation properties are provided by the rigid polyurethane foam. The inner layer should be of a thickness to ensure a temperature reduction to at least 140° C., such that the rigid polyurethane foam is exposed to acceptable temperatures. Shear testing of such a composite system at up to 200° C. exhibited surprisingly high values, which are not achieved with foam molded polyurethane systems. The rotational molding or spraying methods allow the processing of such highly thermally stable systems having elevated bulk densities.

It is preferred according to the invention that the polyisocyanurate plastic be produced by reacting a1) an aromatic polyisocyanate or a2) an isocyanate terminated prepolymer having an NCO content of from 5 to 20 wt. %, which is obtained by the reaction of
  1) 4,4'-diphenylmethane diisocyanate, optionally mixed with 2,4- and 2,2- isomers and 0 to 30 wt. % of more highly functional oligomers, with
  2) a polyether having from 2 to 4 OH groups and a molecular weight of from 1,000 to 6,000, with b) a polyol component comprising
  1) a polyether having from 2 to 4 isocyanate-active hydrogen atoms and a molecular weight of from 1,000 to 7,000,
  2) from 0 to 0.5 wt. % of water,
  3) from 0 to 5 wt. % of a compound having a molecular weigh of from 32 to 1,000 and being selected from the group consisting of aliphatic polyamines, aromatic poly-amines, cycloaliphatic polyamines, or mixtures thereof as crosslinking agent,
  4) from 2 to 10 wt. % of a trimerization catalyst and optionally
  5) auxiliary substances and additives, with the per cents by weight of components b)1), b)2), b)3) b)4) and b)5) being based upon the total weight of component b).

It is also preferred that a mixture of diphenylmethane diisocyanate and polyphenyl-polymethylene polyisocyanates (crude MDI) be used as the aromatic polyisocyanate, and that the reaction of the components a1) or a2) with b) be conducted at an isocyanate index of from 300 to 2,000 (preferably from 350 to 900). It is also preferred that the polyisocyanurate layer be applied using a mixhead and nozzle, wherein the mixhead is advanced either at a defined distance parallel to the axis of rotation, or the pipe is advanced in an axial direction beneath a fixed mixhead.

It also preferred according to the invention that the polyurethane rigid foam be produced by reacting a) an aromatic polyisocyanate with b) a polyol component having an average of at least three isocyanate-reactive hydrogen atoms and comprising
  1) a polyether having at least two hydroxyl groups and a molecular weight of from 300 to 700,
  2) a blowing agent, optionally together with
  3) a compound having at least three hydroxyl groups and a molecular weight of from 62 to 299 as chain extender or crosslinking agent and optionally
  4) auxiliary substances and additives.

In preparing the rigid foam, it is also preferred that a mixture of diphenylmethane diisocyanate and polyphenyl-polymethylene polyisocyanates (crude MDI) be used as the aromatic polyisocyanate. It is also preferred that either water and/or alkanes be used as the blowing agent. The catalyst used during production of the polyisocyanurate plastic is preferably potassium acetate or sodium acetate, which is optionally dissolved in ethylene glycol or diethylene glycol.

All the various components used to produce the polyisocyanurate layer and the polyurethane layer are known in the polyurethane art.

The polyamines of a molecular weight of 32 to 1,000 used as crosslinking agents are preferably a) difunctional amines and imines such as ethylenediamine, propylenediamine, butylenediamine, pentamethylenediamine, hexamethylenediamine and the higher homologues thereof, 1,4-diaminocyclohexane, isophoronediamine, bis-(4-aminocyclo-hexyl)methane, piperazine, bis-(2aminoethyl)piperazine, bis-(3-aminopropyl)piperazine, 2-amino-ethylpiperazine, 3-aminopropyl-piperazine, N,N-dimethylethylene-diamine.

b) more highly functional amines and imines such as diethylene-triamine, triethylenetetramine, tetraethylenepentamine, penta-ethylenehexamine and higher homologues such as tripropyl-tetramine, tetrapropylenepentamine, and pentapropylene-hexamine.

Polyisocyanates useful herein for preparing either the polyiso-cyanurate or the polyurethane foam are known and described, for examples, in W. Siefken in *Justus Liebigs Annalen der Chemie*, 562, pages 75 to 136. Examples include isocyanates of the formula $$Q(NCO)_n$$

wherein n represents a number of from 2 to 4, preferably 2, and

Q represents an aromatic hydrocarbon residue with 6 to 15, preferably 6 to 13 carbon atoms.

Specifically useable polyisocyanates are described in German Offenlegungsschrift 2,832,253, pages 10 to 11. It is most preferred to use commercially available polyisocyanates, such as 2,4- and 2,6-tolylene diisocyanate and mixtures of these isomers (TDI); mixtures of diphenyl-methane diisocyanate and polyphenyl-polymethylene polyisocyanates, as are produced by aniline-formaldehyde condensation and subsequent phosgenation ("crude MDI"); and polyisocyanates containing carbodiimide groups, urethane groups, allophanate groups, isocyanurate groups, urea groups or biuret groups ("modified polyisocyanates").

The polyol component used to prepare the foam layer contains (preferably in amount of from 50 to 90 wt. %) of a polyether having at least two hydroxyl groups and a molecular weight of 300 to 700 produced by addition of propylene oxide and/or ethylene oxide onto starter compounds such as sorbitol, ethylene glycol, trimethylolpropane, glycerol, pentaerythritol and/or sugar. The polyether preferably has an OH value of 300 to 600.

The polyol component used to prepare the foam layer also contains the blowing agent, preferably water (generally in a quantity of 0.5 to 10 wt. %). In addition to the preferably used water, which as is known liberates $CO_2$ upon reaction with isocyanates, blowing agents which may be considered are highly volatile organic substances, for example perhalogenated and partially halogenated hydrocarbons which, at a pressure of 1,013 mbar, boil within the temperature range of $-50°$ C. to $+75°$ C., preferably of $+10°$ C. to $+25°$ C., such as trichlorofluoromethane (R11 ), 1,1-dichloro-2,2,2-trifluoroethane (R123), 1,1-dichloro-1 -fluoro-ethane (R141b), dichlorofluoromethane (R12), 1-chloro-1,1-difluoroethane (142b ), 1,1,1,2-tetrafluoroethane (R134a), together with aliphatic or cycloaliphatic $C_3$–$C_6$ hydrocarbons, for example propane, butane, pentane, isopentane, cyclopentane and cyclohexane.

The polyol component used to prepare the foam layer also optionally contains (a quantity of 0 to 30 wt. %) of a polyether having tertiary amino groups and a molecular weight of 200 to 700 obtained by addition of ethylene oxide and/or propylene oxide onto, for example, triethanolamine, diisopropanolamine or ethylene diamine. The polyether preferably has an OH value of 250 to 700. The polyol component may optionally also contain compounds having at least three hydroxyl groups and a molecular weight of 32 to 299 which act as chain extenders or crosslinking agents. Examples of such compounds are described in German Offenlegungsschrift 2,832,253, pages 19 to 20.

Auxiliary substances and additives, such as emulsifiers and foam stabilizers, may optionally also be used. Preferred emulsifiers are those based on alkoxylated fatty acids and relatively high molecular weight alcohols. Foam stabilizers which may be considered are principally polyether siloxanes, particularly non-water-soluble types. These compounds are generally of a structure such that a copolymer of ethylene oxide and propylene oxide is attached to a polydimethyl-siloxane residue. Water-soluble foam stabilizers are described, for example, in U.S. Pat. Nos. 2,834,748, 2,917,480 and 3,629,308.

The polyol component used to produce the foam layer may also contain reaction inhibitors, for example substances which react acidically such as hydrochloric acid or organic acid halides; cell regulators such as paraffins or fatty alcohols or dimethylpolysiloxanes; pigments or dyes; stabilizers countering the effects of ageing and weathering; plasticizers; and fungistatic and bacteriostatic agents; and fillers such as barium sulphate, silica, carbon black or prepared chalk.

Further examples of optionally used surface-active additives, foam stabilizers, cell regulators, reaction inhibitors, flame retardant substances, plasticizers, dyes, fillers and fungistatic and bacteriostatic substances together with details relating to the use and mode of action of these additives may be found in *Kunststoff Handbuch*, volume VII, edited by Vieweg and Höchtlen, Carl-Hanser Verlag, Munich, 1966, for example on pages 103–113.

According to the invention, the polyol component used to prepare the foam may also contain catalysts known per se from polyurethane chemistry, such as tertiary amines and/or organometallic compounds.

In performing the process of the invention, a pipe is set in rotation at a defined rotational speed in equipment appropriate to its diameter. Depending upon the required thickness of the various layers, the reaction mixtures are applied through a slot nozzle at a defined rate of advance of the mixheads. Different nozzle geometries, preferably slot nozzles, are generally used for different output rates. If the rotating pipe is moved in the direction of its longitudinal axis, the mixheads must be in a fixed position at the given distance.

EXAMPLES (pbw=parts by weight; MW=molecular weight)
Pipe diameter: 63 mm
Rotational speed of pipe: 95 rpm
Output for high temperature insulation: 1,500 g/min
Mixing head advance: 100 cm/min
Thickness of foam insulation: 20 mm Polyisocyanurate plastic formulation:

---

100 pbw trimethylolpropane-started polyether with propylene oxide, OH number of 56 and MW of 3,000
0.2 pbw water
1.0 pbw foam stabilizer B 8421 (Goldschmidt)
4.0 pbw potassium acetate (25% in ethylene glycol)

-continued 200 pbw crude MDI (NCO content: 31.8 wt. %)

The density of the polyisocyanurate layer was 500 kg/m³.
Rigid PUR foam formulation:

| 50 pbw | sugar-started polyether with propylene oxide, OH value of 450, and MW of 350 |
| 50 pbw | sorbitol/glycerol-started polyether with propylene oxide, OH value of 450 and MW of 570 |
| 5 pbw | water |
| 1 pbw | foam stabilizer B 8423 (Goldschmidt) |
| 1.5 pbw | dimethylcyclohexylamine |
| 185 pbw | crude MDI (NCO 31.8 wt. %) |

Index=110.

The rigid foam was produced using the customary foam molding process, by filling the cavity between the steel pipe coated with polyisocyanurate plastic and a polyethylene jacketing pipe (having a diameter of 200 mm). The density of the foam was 90 kg/m³.

Properties of the high temperature composite pipe of the invention were compared with a customary plastic-jacketed pipe:

Both pipes had the same steel pipe and jacketing pipe diameters (60.3 and 200 mm respectively). The high temperature composite pipe has the two-layer structure described above; the plastic-jacketed pipe merely has a single-layer structure also prepared from the rigid PUR foam described above.

Tangential shear strength [MPa] to EN 253

| Test temperature [°C.] composite | Plastic-jacketed pipe | High temperature pipe |
| --- | --- | --- |
| Room temperature | 0.7 | 0.8 |
| 140 | 0.35 | 0.6 |
| 180 | 0.1 | 0.45 |
| 200 | 0 | 0.35 |

As these shear tests demonstrate, at elevated temperatures (180° C., 200° C.), it is only the high temperature composite pipe which exhibits the necessary shear strength justifying its use as a composite pipe. In the customary rigid polyurethane foams, decomposition reactions and reaching the softening temperature result in inadequate shear strength.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for insulating pipes comprising applying at least one layer of a polyisocyanurate plastic to a steel pipe, applying at least one layer of rigid polyurethane foam to said polyisocyanurate layer and covering said foam with an outer layer.

2. The process of claim 1, wherein the polyisocyanurate plastic is produced by reacting a1) an aromatic polyisocyanate or a2) an isocyanate terminated prepolymer having an NCO content of 5 to 20 wt. %, which is prepared by reacting
 1) 4,4'-diphenylmethane diisocyanate, optionally mixed with 2,4- and 2,2- isomers and 0 to 30 wt. % of more highly functional oligomers thereof, with
 2) a polyether having from 2 to 4 OH groups and a molecular weight of 1,000 to 6,000, with b) a polyol component comprising
 1) a polyether having from 2 to 4 isocyanate-active hydrogen atoms and a molecular weight of from 1,000 to 7,000,
 2) from 0 to 0.5 wt. % of water,
 3) from 0 to 5 wt. % of a compound having a molecular weigh of from 32 to 100 and being selected from the group consisting of aliphatic polyamines, aromatic polyamines, cycloaliphatic polyamines, or mixtures thereof as crosslinking agent, and
 4) from 2 to 10 wt. % of a trimerization catalyst, with the per cents by weight of components b)1), b)2), b)3) and b)4) being based upon the total weight of component b).

3. The process of claim 2, wherein a mixture of diphenylmethane diisocyanate and polyphenyl-polymethylene polyisocyanates is used as the aromatic polyisocyanate.

4. The process of claim 2, wherein the reaction of components a1) or a2) with b) is conducted at an isocyanate index of from 300 to 2,000.

5. The process of claim 1, wherein the rigid foam is produced by reacting a) an aromatic polyisocyanate with b) a polyol component having an average of at least three isocyanate-reactive hydrogen atoms and comprising
 1) a polyether having at least two hydroxyl groups and a molecular weight of from 300 to 700,
 2) a blowing agent, and optionally together with
 3) a compound having at least three hydroxyl groups and a molecular weight of from 62 to 299 as chain extender or crosslinking agent.

6. The process of claim 5 wherein a mixture of diphenylmethane diisocyanate and polyphenyl-polymethylene polyisocyanates is used as the aromatic polyisocyanate.

7. The process of claim 5, wherein water is used as the blowing agent.

8. The process of claim 5, wherein one or more alkanes is used as the blowing agent.

9. The process of claim 1, wherein the polyisocyanurate layer and/or the rigid polyurethane foam layer is applied by a rotational molding process comprising i) rotating said pipe, and ii) applying said layer through a slot nozzle to said rotating pipe.

10. The process of claim 1, wherein the polyisocyanurate layer and/or the rigid polyurethane foam layer is applied by spraying process.

* * * * *